United States Patent
Misra et al.

(10) Patent No.: US 9,562,156 B2
(45) Date of Patent: Feb. 7, 2017

(54) BIO-BASED ACRYLONITRILE BUTADIENE STYRENE (ABS) POLYMER COMPOSITIONS AND METHODS OF MAKING AND USING THEREOF

(71) Applicant: University of Guelph, Guelph (CA)

(72) Inventors: Manjusri Misra, Guelph (CA); Ryan Vadori, Guelph (CA); Amar Kumar Mohanty, Guelph (CA)

(*) Notice: Subject to any disclaimer, the term of this patent is extended or adjusted under 35 U.S.C. 154(b) by 0 days.

(21) Appl. No.: 14/796,508

(22) Filed: Jul. 10, 2015

(65) Prior Publication Data

US 2016/0009913 A1 Jan. 14, 2016

Related U.S. Application Data

(60) Provisional application No. 62/023,235, filed on Jul. 11, 2014.

(51) Int. Cl.
  *C08L 67/02* (2006.01)
  *C08L 55/02* (2006.01)
  *C08L 67/08* (2006.01)

(52) U.S. Cl.
  CPC ............ *C08L 55/02* (2013.01); *C08L 2201/08* (2013.01); *C08L 2205/035* (2013.01)

(58) Field of Classification Search
  CPC ........................................................ C08L 55/02
  USPC .................................. 525/165, 190; 265/239
  See application file for complete search history.

(56) References Cited

U.S. PATENT DOCUMENTS

| | | | |
|---|---|---|---|
| 2012/0184672 A1 | 7/2012 | Riscanu et al. | |
| 2012/0220711 A1 | 8/2012 | Zhu et al. | |
| 2012/0252977 A1 | 10/2012 | Zhu et al. | |
| 2014/0080975 A1* | 3/2014 | Zhu et al. ............... | C08L 67/04 525/190 |

FOREIGN PATENT DOCUMENTS

| | | |
|---|---|---|
| EP | 2700678 A1 | 2/2014 |
| EP | 2706090 A1 | 3/2014 |

OTHER PUBLICATIONS

Li, Yongjin et al. Improvement in toughness of poly(l-lactide) (PLLA) through reactive blending with acrylonitrile-butadiene-styreme copolymer (ABS): Morphology and properties, European Polymer Jrnl, 2009, p. 738-746, v45, Elsevier Ltd.
Sun, Shulin et al. Polylactide Toughening with Epoxy-Functionalized Grafted Acrylonitrile-Butadiene-Styrene Particles, Journal of Applied Polymer Science, 2011, p. 2992-2999, vol. 122, Wiley Periodicals Inc.
Chevali, Venkata S. et al, Mechanical Properties of Hybrid Lignocellulosic Fiber-Filled Acrylonitrile Butadiene Styrene (ABS) Biocomposites, Polymer-Plastics Technology and Engineering, 2015, p. 375-382, v54, Taylor & Francis Group, LLC.
Yeh, Sku-Kai et al, Wood-plastic composites formulated with virgin and recycled ABS, Composites Science and Technology, 2009, p. 2225-2230, v69, Elsevier Ltd.
Liu, Feng et al, On the Morphology of Polymer-Based Photovoltaics, Journal of Polymer Science Part B: Polymer Physics, 2012, p. 1018-1044, v50, Wiley Periodicals, Inc.

* cited by examiner

*Primary Examiner* — Terressa Boykin
(74) *Attorney, Agent, or Firm* — Eduardo Krupnik; Millez Thomson LLP

(57) ABSTRACT

A high performance acrylonitrile butadiene styrene (ABS) polymer blend comprising ABS, polylactic acid (PLA), an acrylic copolymer based lubricant and a polymeric chain extender.

16 Claims, 2 Drawing Sheets

BIO-BASED ACRYLONITRILE BUTADIENE STYRENE (ABS) POLYMER COMPOSITIONS AND METHODS OF MAKING AND USING THEREOF

FIELD OF THE INVENTION

The present invention is in the field of acrylonitrile butadiene styrene (ABS) blends that incorporate a significant portion of renewable content through blending with poly (lactic acid) (PLA), and methods of making and using thereof.

BACKGROUND OF THE INVENTION

Acrylonitrile Butadiene Styrene (ABS) was first discovered during World War II when its basis, Styrene Butadiene Rubber (SBR), was used for alternatives to rubber. Commercially ABS polymers first became available in the early 1950s in an attempt to obtain the best properties of both polystyrene and styrene acrylonitrile.

ABS, however, has several disadvantages. ABS is (1) sensitive to thick sections in articles of manufacture which may cause voids, bubbles or sink; (2) susceptible to attack by hydrocarbons and other organic solvents; (3) exhibits low heat resistance and limited weather resistance; (4) relatively expensive to manufacture; and (5) is petroleum resource based.

There exists a need for materials, such as composite materials, that exhibit similar or improved mechanical properties, such as impact resistance and/or heat resistance, compared to neat ABS while being less expensive to manufacture, and from a resource base that is sustainable.

Numerous efforts have been made to increase the sustainability of traditional petroleum based polymers including blending with renewable resource based polymers. The preliminary research on ABS/PLA blends has showed poor performance due to incompatibility between the two. Several attempts have been made to increase the compatibility through the use of additives.

United States Patent Application No US/20120252977 describes a PLA composition in which PLA is modified with ABS and at least one compatibilizer selected from selected from the group consisting of: a poly (styrene-ethylene-butadiene-styrene) copolymer grafted with maleic anhydrides, an acrylonitrile-butadiene-styrene copolymer grafted with maleic anhydrides, a polystyrene grafted with maleic anhydrides, and an ethylene-ethyl acrylate-glycidyl methacrylate. In this application the PLA based blends include from about 34% to 47% by weight (wt. %) PLA, while the ABS can be anywhere from 15 wt. % to 70 wt. %. The highest impact strength alleged is 101 J/m with this system. The blends do not include a lubricant, including an acrylic copolymer based lubricant.

European Patent Application No EP/2706090 describes a blended polymer system that contains polycarbonate (PC), ABS and PLA, and additives such as flame retardants and modified talc. Unfortunately, mechanical properties are not given for these blends, only crystallinity, heat distortion, and flame retardancy are investigated. The blends do not include a lubricant, including an acrylic copolymer based lubricant.

European Patent Application No EP/2700678 describes a biodegradable polymer composite material comprising a biodegradable resin (PLA, polyhydroxybutarate, or poly-caprolactone), ABS, and a reactive compatibilizer, such as glycidyl methacrylate, or maleic anhydride. Some improvement was seen relative to PLA properties, but only when high ABS amounts were used. The blends do not include a lubricant, including an acrylic copolymer based lubricant.

United States Patent Application No US/20120220711 describes heat resistant PLA/ABS blends. The blends of this document include an oligomeric chain extender to increase adhesion, thereby increasing the heat distortion temperature. The blends may optionally include a stabilizer, an impact modifier and a filler. The blends do not include a lubricant, including an acrylic copolymer based lubricant. The best blend outlined in this document has an impact strength of 102 J/m with a heat distortion temperature of 98.1° C. According to this application, the PLA should be the "significant component", meaning that PLA is present in at least thirty weight percent (30 wt. %) or more of the composition.

United States Patent Application No US 2012/0184672 describes the use of additives to increase the impact resistance and/or heat deflection temperature. The use of an oligomeric chain extender in addition to several other additives, such as plasticizer, fillers, impact modifier, and lubricant are employed. The PLA content in these blends is about 50 wt. % or more. The blends do not include ABS, or a lubricant, including an acrylic copolymer based lubricant.

Li et al., *European Polymer Journal* 45(3) 738-746 (2009) describes the use of styrene-acrylonitrile (SAN) grafted with glycidyl methacrylate (GMA), which is denoted SAN-GMA to act as an intermediary between the two phases. This paper describes a decrease in the size of the dispersed phase (ABS) upon reactive blending, which led to an increase in the toughness of the blend. This increase, however, was modest for the amount of additive that was used. The blends do not include a lubricant, including an acrylic copolymer based lubricant.

Jo et al., *Journal of Applied Polymer Science* 125 (S2) 231-238 (2012) again attempts to use additives during blending to improve the performance of PLA/ABS blends. Although many different additives were attempted, the researchers showed that the best performance was attained with SAN-GMA in addition to a small amount of thermal stabilizer. However, a great deal of additive was used to achieve a modest improvement, their best blend being over 20 wt. % additive The blends do not include a lubricant, including an acrylic copolymer based lubricant.

Sun et al. *Journal of Applied Polymer Science* 122(5) 2992-2999 (2011) explains grafting GMA onto ABS before using it to toughen PLA. The improvement in the impact resistance achieved through this method was substantial. However, the method used to graft the GMA onto the ABS involved polymerizing the ABS from constituent monomers. This adds complexity and cost to the processing of such materials, decreasing their value and potential for use in commercial markets. The blends do not include a lubricant, including an acrylic copolymer based lubricant.

Chevali et al. *Polymer-Plastics Technology and Engineering* 54 375-382 (2015) describes blending ABS with two natural fibers to form hybrid lignocellulosic biocomposites. With the inclusion of 20 wt. % fiber into the ABS matrix, impact resistance was reduced while the modulus was increased compared to neat ABS. The blends do not include a lubricant, including an acrylic copolymer based lubricant.

Yeh et al. *Composites Science and Technology* 69 2225-2230 (2009) describes blending ABS with wood flour to form ABS based wood-plastic composites. The composites contained 50 wt. % wood fiber. With the use of coupling agents between the fiber and matrix, they were able to increase the properties of the composites compared to without coupling agent. The blends do not include a lubricant, including an acrylic copolymer based lubricant.

The art described above details blending of ABS with PLA and other bio-based plastics for increased sustainability. However, blends achieving performance similar to ABS has remained difficult to achieve.

There is a need for ABS based materials that incorporate some amount of bio-content to increase the sustainability of the material, and to exhibit performance values that are similar to ABS materials, and methods of making thereof.

SUMMARY OF THE INVENTION

Acrylonitrile butadiene styrene (ABS)-based blends containing polylactic acid (PLA) and methods of making and using thereof are described herein. Composites containing the blend are also described herein.

In one embodiment, the blends of the present invention contain ABS in an amount from about 20 wt. % to about 90 wt. % of the entire blend and any range there in between, for example from about 60 wt. % to about 80 wt. %.

In another embodiment, the blends contain up to about 30 wt. % PLA. In other embodiments, the blends contain more than 30 wt. % PLA.

In another embodiment, the blends of the present invention contain one or more additives. In some embodiments, the blends contain a lubricant in combination with one or more chain extenders.

In one embodiment, the concentration of the lubricant is from about 1 wt. % to about 10 wt. % and any range there in between, such as from about 2 wt. % to about 5 wt. %.

In some embodiments, the chain extender is an epoxy-functionalized styrene-acrylic oligomers/polymers, such as those available under the tradename JONCRYL®. In some embodiments, the chain extender contains glycidyl methacrylate (GMA). Exemplary chain extenders of this type include, but are not limited to, JONCRYL® ADR-4368-C/CS. In some embodiments, the concentration is from about 0.1 wt. % to about 2 wt. % and any range there in between, for example from about 0.5 wt. % to about 1.5 wt. %, or about 1 wt. %.

In one embodiment, the blends of the present invention exhibit a Notched Izod Impact Strength of at least about 140 J/m. In another embodiment, the blends of the present invention exhibit a Notched Izod Impact Strength ranging from 140 J/m to 600 J/m.0

In one embodiment, the blends of the present invention exhibit a tensile strength of at least about 40 MPa. In another embodiment, the blends of the present invention exhibit a tensile strength ranging from about 40 MPa to about 50 MPa.

In one embodiment, the blends of the present invention exhibit a flexural strength of at least about 60 MPa. In another embodiment, the blends of the present invention exhibit a tensile strength ranging from about 60 MPa to about 78 MPa In another embodiment the present invention provides for composites including the blends of the previous embodiments and one or more additives, such as fillers. Classes of fillers include natural fibers, mineral fillers, and combinations thereof. In particular embodiments, the composite contains one or more natural fibers.

The blends and/or composites of the present invention can be used to form a variety of articles of manufacture, such as injection molded articles, such as car parts, toys, consumer products, building materials, etc.

In another embodiment, the present invention provides for a method of making a high performance acrylonitrile butadiene styrene (ABS). The method includes: (a) forming a mixture of ABS, polylactic acid (PLA), an acrylic copolymer based lubricant and a polymeric chain extender polymer; and (b) extruding the mixture at a temperature of 230° C. to 250° C. to form the high performance ABS polymer blend.

BRIEF DESCRIPTION OF THE DRAWINGS

The invention will be better understood and objects of the invention will become apparent when consideration is given to the following detailed description thereof. Such description makes reference to the annexed drawings wherein.

DETAILED DESCRIPTION OF THE INVENTION

I. Definitions

Figure 1:
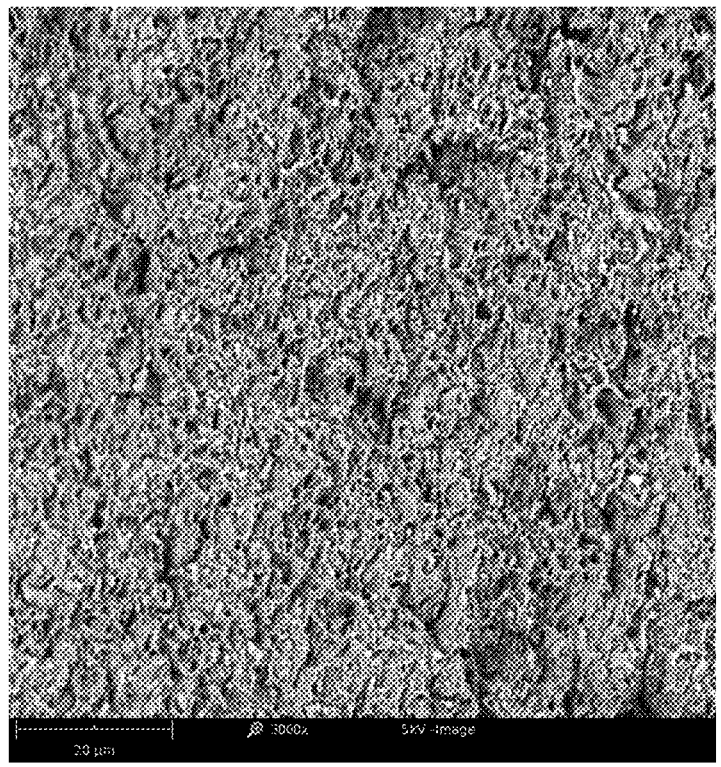
FIG. 1 is a scanning electron microscopy (SEM) image of the impact fracture surface of example blend 6A (see Example 6).

In this specification and in the claims that follow, reference will be made to a number of terms that shall be defined to have the meanings below. All numerical designations, e.g., temperatures, concentrations, dimensions and weight, including ranges, are approximations that typically may be varied (+) or (−) by increments of 0.1, 1.0, or 10.0, as appropriate. All numerical designations may be understood as preceded by the term "about".

The singular form "a", "an", and "the" includes plural references unless the context clearly dictates otherwise.

The term "comprising" means any recited elements are necessarily included and other elements may optionally be included. "Consisting essentially of" means any recited elements are necessarily included, elements that would materially affect the basic and novel characteristics of the listed elements are excluded, and other elements may optionally be included. "Consisting of" means that all elements other than those listed are excluded. Embodiments defined by each of these terms are within the scope of this invention.

"Composite", as used herein, generally means a combination of two or more distinct materials, each of which retains its own distinctive properties, to create a new material with properties that cannot be achieved by any of the components acting alone.

The prefix "bio-" as used herein refers to a material that has been derived or partially derived from a renewable resource.

The term "renewable resource", as used herein, refers to a resource that is produced by a natural process at a rate comparable to its rate of consumption (e.g., within a 100 year time frame). The resource can be replenished naturally or via agricultural techniques.

The term "bio-based content", as used herein, refers to the amount of bio-plastic in a material as a percent of the weight (mass) of the total weight (mass) in the product.

"Recyclable", as used herein, refers to a product or material that can be reprocessed into another, similar or often different products.

"Blend", as used herein, means a macro-homogeneous mixture of two or more different polymers. The resultant blend may contain distinct phases of its components.

The terms "heat deflection temperature" or "heat distortion temperature" (HDT) are used interchangeably and refer to the temperature at which a polymer or plastic sample deforms under a specified load. The heat distortion temperature is determined by the following test procedure outlined in ASTM D648. The test specimen is loaded in three-point bending in the edgewise direction. The two most common loads are 0.455 MPa or 1.82 MPa and the temperature is increased at 2° C./min until the specimen deflects 0.25 mm.

"Impact strength", as used herein, refers to the capability of a material to withstand a suddenly applied load and is expressed in terms of energy. Impact strength is typically measured with the Izod impact strength test or Charpy impact test, both of which measure the impact energy required to fracture a sample. Izod impact testing is an ASTM standard method of determining the impact resistance of materials. An arm held at a specific height (constant potential energy) is released. The arm hits the sample and breaks it. From the energy absorbed by the sample, its impact energy is determined. A notched sample is generally used to determine impact energy and notch sensitivity.

The terms "super tough" and "non-breakable" are used interchangeably and refer to a polymer blend which shows a no break notched Izod impact behavior, as determined according to ASTM Standard D256.

The term "non-break", as used herein, refers to an incomplete break where the fracture extends less than 90% of the distance between the vertex of the notch and the opposite side as per ASTM D256. Results obtained from the non-break specimens shall not be reported as per ASTM D256.

II. Acrylonitrile Butadiene Styrene (ABS)/Polylactic Acid (PLA)-Based Blends

A. Acrylonitrile Butadiene Styrene (ABS)

Acrylonitrile butadiene styrene (ABS) is a common thermoplastic. Its glass transition temperature is approximately 105° C. (221° F.). ABS is amorphous and therefore has no true melting point.

Acrylonitrile-butadiene-styrene has the formula of $(C_8H_8)_x(C_4H_6)_y(C_3H_{3N})_z$, wherein x is a number resulting in the ABS having from about 40 to about 60 weight percent of styrene content, y is a number to resulting in the ABS having from about 5 wt. % to about 45 wt. % of butadiene content, and z is a number resulting in the ABS having from about 15 wt. % to about 35 wt. % of acrylonitrile content. ABS can be recycled, an important property considering its use with PLA.

ABS is a terpolymer made by polymerizing styrene and acrylonitrile in the presence of polybutadiene. The result is a long chain of polybutadiene criss-crossed with shorter chains of poly(styrene-co-acrylonitrile). The nitrile groups from neighboring chains, being polar, attract each other and bind the chains together, making ABS stronger than pure polystyrene. The styrene gives the plastic a shiny, impervious surface. The polybutadiene, a rubbery substance, provides resilience even at low temperatures.

ABS can be functional through a temperature range of −40° C. to 90° C. For the majority of applications, ABS can be used between −20° C. and 80° C. (−4 and 176° F.) as its mechanical properties vary with temperature. The properties are created by rubber toughening, where fine particles of elastomer are distributed throughout the rigid matrix.

ABS is commercially available from a number of companies including Dow Chemical Co., LG Chemical Company, Sabic Innovative Plastics, and BASF. These commercially available ABS polymers are not entirely pure resins. As a part of the manufacturing process, particularly the emulsion polymerization process, there are surfactants and other minor ingredients used to facilitate polymerization of the ABS. Because these trace amounts of surfactants remain a part of the polymer resin when sold commercially, their presence can have a positive or negative effect on the mixing of such resins with PLA. Commercially available ABS that may be used in the blend of the present invention include those sold under the trademark MAGNUM®, including the high impact ABS MAGNUM® grade 1150 EM.

The concentration of ABS in the blend of the present invention may be from about 20 wt. % to about 90 wt. % of the blend, and any range in between such as from about 70 wt. % to about 80 wt. % of the blend or from about 60 wt. % to about 85 wt. % of the blend.

B. Polylactic Acid (PLA)

Polylactic acid (PLA) is a renewable polymer derived from naturally sourced monomers and derivatives thereof. PLA is a commercially-available polyester-based resin made using lactic acid. The lactic acid may be obtained, for example, by decomposing biomass, such as corn starch, to obtain the monomer. In some embodiments, the PLA may be a homopolymers of lactic acid, including poly(L-lactic acid) (PLLA), in which the monomer unit is L-lactic acid, poly (D-lactic acid) (PDLA), in which the monomer unit is D-lactic acid, and poly(D,L-lactic acid) in which the monomer structure units are D,L-lactic acid, that is, a mixture in various proportions (e.g., a racemic mixture) of D-lactic acid and L-lactic acid monomer units. In other embodiments, the PLA is a stereocomplex PLLA and PDLA. In other embodiments, polylactic acid resins which are crosslinked may be used.

In other embodiments, the PLA is a copolymer of lactic acid containing at least about 50, 60, 70, 80, or 90 wt. % lactic acid comonomer content based on the weight of the copolymer and containing one or more comonomers other than lactic acid comonomer in amounts of less than 50, 40, 30, 20, or 10 wt. %, of the copolymer. Exemplary comonomers include hydroxycarboxylic acids other than lactic acid, for example, one or more of any of the following hydroxycarboxylic acids: glycolic acid, hydroxybutyrate (e.g., 3-hydroxybutyric acid, 4-hydroxybutyric acid), hydroxyvaleric acid (e.g., 4-hydroxyvaleric acid, 5-hydroxyvaleric acid) and hydroxycaproic acid (e.g., 6-hydroxycaproic acid).

In one embodiment, PLA may be virgin PLA. In some embodiments, the PLA has high optical purity. Using PLA of high optical purity may improve the HDT of the composites prepared from PLA. The weight average molecular weight of the PLA can vary. However, in some embodiments, the average molecular weight of the PLA is from about 10,000 and 500,000 Dalton, preferably from about 10,000 to about 300,000 Daltons.

In one embodiment, the concentration of PLA in the blend may range from about 10 wt. % to about 70 wt. % of the blend. More than 70 wt. % of blend may also be used. In another embodiment, the PLA may be provided as a minor component in the blend compared to ABS. "Minor component" as used herein means that the concentration of PLA is less than about 30 wt. % of the blend, i.e. no more than about 30 wt. %, but not including 30 wt. %. When provided as a minor component of the blend, the concentration of polylactic acid is from about 10 wt. % to about 29 wt. % of the composition and any concentration in between, such as from about 15 wt. % to about 20 wt. % of the composition.

In some embodiments, PLA may be generated as post-consumer and post industrial waste, which can be used in place of virgin PLA or in combination with virgin PLA, may also be used in the blends and composites described herein. In those embodiments where recycled PLA is used, the recycled PLA has a relatively high weight average molecular weight, such as at least about 50,000, 60,000, 70,000, 75,000, 85,000, 90,000, 95,000, or 100,000 Daltons. In some embodiments, the weight average molecular weight of PLA is from about 5,000 Daltons to about 100,000 Daltons. In other embodiments, the weight average molecular weight is from about 70,000 to about 100,000 Daltons. In particular embodiments, the PLA is semi-crystalline and has the molecular weight described above. In those embodiments wherein recycled PLA is used in combination with virgin PLA, the concentration of recycled PLA is from about 10 wt. % to about 30 wt. % of the combination of recycled PLA and virgin PLA.

Virgin or neat PLA refers to formulations containing only PLA. The impact strength of virgin or neat PLA is 31 J/m and its HDT (under a 455 kPa flexural load) is 55° C.

C. Lubricant

In some embodiments, the blend of the present invention includes one or more lubricants. "Lubricant", as used herein, refers to an additive introduced to improve the metal release and enhance processability of PLA. In particular embodiments, the lubricant is an acrylic copolymer based lubricant such as that available under the trade name BIO-STRENGTH®900. The concentration of the lubricant may vary. In some embodiments, the concentration of the lubricant may be from about 1 wt. % to about 10 wt. % of the composition and any range in between, for example from about 2 wt. % to about 5 wt. % of the composition. BIOSTRENGTH®900 is described as being effective in minimizing sticking of PLA to metal during demanding calendaring and injection molding processes. However, BIOSTRENGTH®900 has not been described to change mechanical properties of a blend such as impact strength, tensile strength and flexural strength.

D. Polymeric Chain Extender

In some embodiments, the blend includes a lubricant, as described above, in combination with a chain extender. "Chain extender", as used herein, refers to a molecule that increases the molecular weight of one or more polymers in the blend. In some embodiments, the chain extender is a polymeric chain extender that increases the molecular weight in the blend. Increasing the molecular weight of the PLA increases the melt viscosity, melt strength, and intrinsic viscosity of the polymer.

Suitable polymeric chain extenders include, but are not limited to, epoxy-functionalized styrene-acrylic oligomers/polymers available under the tradename JONCRYL®. In some embodiments, the JONCRYL® chain extender contains glycidyl methacrylate (GMA). Exemplary JONCRYL® materials of this type include, but are not limited to, JONCRYL® ADR-4368-C/CS.

The concentration of the chain extender in the blends of the present invention may vary. In some embodiments, the concentration of the chain extender may be from about 0.1 wt. % to about 2 wt. % of the composition and any range in between, like from about 0.5 wt. % to about 1.5 wt. % of the composition, more preferably about 1 wt. % of the composition.

E. Properties of the Blends

Some blend compositions described herein exhibit similar or improved mechanical properties compared to neat or unmodified ABS of two different grades. For example, a summary of various mechanical properties for unmodified ABS and exemplary blends of the present invention is shown in Example 1. Some of the present invention exhibit improved Notched Izod Impact Strength compared to unmodified ABS, as well as similar or improved tensile strength and improved flexural strength.

III. Composites

The blends described herein can be used to prepare ABS-based composites. The composites may be prepared by combining the blends described above with one or more additives selected from fillers, such as natural fibers and/or mineral fillers to form the composites.

A. Natural Fibers/Biofillers

The composites can contain one or more natural fibers. Exemplary natural fibers include, but are not limited to, bast fibers, leaf fibers, grass fibers (perennial grasses), straw fibers (agricultural residues), and seed/fruit fibers. In addition, pyrolyzed biomass based chars may be used as biofillers. These chars are herein referred to collectively as BioChar.

The composites may also include one or more residues (biofillers) from industrial processes, such as those in the food industry. Exemplary residues include, but are not limited to, coffee chaff, coffee grind, food or leftover residues.

Perennial grasses include, but are not limited to, switchgrass and miscanthus. Agricultural residues include, but are not limited to, soy stalk, wheat straw, corn stover, soy hull, and oat hull.

Perennial grasses and agricultural residues include, but are not limited to, lignocellulosic fibers having about 35% cellulose and other constituents such as hemicellulose, lignin, pectin, protein and ash.

The natural fibers can have an average length from about 2 to about 10 mm, preferably from about 2 to about 6 mm, particularly for injection molding processes. However, fibers less than 2 mm and greater than 6 mm or 10 mm may also be used. Natural fibers may also be in a particulate form, particles may be as small as 50 μm or as large as 1 mm.

Natural fibers can be added to the ABS-based blend system directly with or without any surface treatment (e.g., devoid of surface treatment, such as chemical treatment) to achieve the desired performance. A mixture of two more fibers can also be used. This may especially be important in the case of fiber supply chain issues that can arise while using one particular type of fiber.

The content of the natural fiber(s) in the composite may be from about 0 wt. % to about 35 wt. % and any range in between, such as from about 0 wt. % to about 30 wt. % of the composite, more preferably from about 0 wt. % to about 25 wt. %, most preferably from about 0 wt. % to about 15 wt. %. When the natural fibers are present, the concentration can be from about 10 wt. % to about 30 wt. % of the composite, preferably from about 10 wt. % to about 25 wt. % of the composite, more preferably from about 10 wt. % to about 20 wt. % of the composite.

The use of natural fiber also reduces the cost of the final formulation, as up to 30 wt. % of the composite can be replaced with these fibers as per the property requirements of the end product.

B. Mineral Fillers

The composite can also contain one or more mineral fillers. Suitable mineral fillers include those known to be useful in the compounding of polymers. Exemplary mineral fillers include, but are not limited to, talc, calcium carbonate, calcium sulphate, mica, magnesium oxysulphate, silica, kaolin and combinations thereof.

The content of the mineral filler(s) in the PLA-based composite may be from about 0 wt. % to about 25 wt. % of the composite. When mineral filler is present, it can be present in an amount from about 5 wt. % to about 25 wt % of the composite, preferably from about 5 wt. % to about 20 wt. % of the composite, more preferably from about 5 wt. % to about 15 wt. % of the composite.

IV. Method of Manufacturing Blends and Composites Containing the Blends

A. Polylactic Acid

Poly (lactic acid) can be made using a variety of techniques known in the art, such as polycondensation. In the polycondensation method, L-lactic acid, D-lactic acid, or a mixture of these, or lactic acid and one or more other hydroxycarboxylic acids, may be directly subjected to dehydropolycondensation to obtain a polylactic acid of a specific composition. For example, in the direct dehydration polycondensation process the lactic acid or other hydroxycarboxylic acids may be subjected to azeotropic dehydration condensation in the presence of an organic solvent, such as a diphenyl ether-based solvent. Such polymerization reaction, for example, may progress by removing water from the azeotropically distilled solvent and returning substantially anhydrous solvent to the reaction system.

Polylactic acid may also be made by ring-opening polymerization methods. In the ring-opening polymerization method, lactide (i.e., cyclic dimer of lactic acid) is polymerized via a polymerization adjusting agent and a catalyst to obtain polylactic acid. Lactide includes L-lactide (i.e., dimer of L-lactic acid), D-lactide (i.e., dimer of D-lactic acid), DL-lactide (i.e., mixture of L- and D-lactides), and meso-lactide (i.e., cyclic dimer of D- and L-lactic acids). These isomers can be mixed and polymerized to obtain polylactic acid having a desired composition and crystallinity. Any of these isomers may also be copolymerized by ring-opening polymerization with other cyclic dimers (e.g., glycolide, a cyclic dimer of glycolic acid) and/or with cyclic esters such as caprolactone, propiolactone, butyrolactone, and valerolactone.

B. Blends

The blends can be prepared using techniques known in the art. In some embodiments, prior to the processing, all the components were dried, for example, at 60° C.-80° C. for at least 4 h. In some embodiments, the blends can be prepared by extrusion. In some embodiments, the components of the blend were extruded at a temperature from about 230° C. to about 250° C. and any temperature in between, preferably from about 230° C. to about 240° C. In one embodiment, the composites are prepared by co-extruding (a) acrylonitrile butadiene styrene (ABS); (b) poly (lactic acid) (PLA), (c) one or more acrylic copolymer-based lubricants, and (d) one or more chain extenders.

The injection molding conditions can vary as well. In some embodiments, the injection molding conditions were as follows: melt temperature from about 220° C. to about 240° C., mold temperature from about 30° C. to 60° C. and cooling time from about 30 to about 60 seconds.

In some embodiments, lab scale extrusions and injection moldings were performed on a micro twin-screw extruder and micro injection molder (DSM Research, Netherlands). The screw configuration in the extruder was co-rotating and was operated at a RPM of 100. Pilot scale extrusion can be carried out in a co-rotating twin-screw extruder (Leistritz, Germany) with a screw diameter of 27 mm. Injection molding machine (Arburg, Germany) can be used for the pilot scale injection molding.

C. Composites

The composites can be prepared using techniques known in the art. The blend can be dried prior to extrusion to form the composite. In some embodiments, the blend is dried at a temperature from about 60° C. to 80° C. for a period of time from about 4 to about 6 hours.

In one embodiment, the composites are prepared by co-extruding a blend containing, with at least one filler (e.g., natural fibers and/or mineral fillers), nucleating agent, and/or chain extender. In those embodiments where the filler is or contains one or more natural fibers, the fiber may be added to the PLA-based blend directly without any surface treatment to achieve the desired performance. After extrusion, the extruded pellets can be dried, for example at 80° C. for at least 42 hours.

In some embodiments, the PLA-based blend forms a matrix or continuous phase of the composite and the fillers and/or other additives form a dispersed phase.

The method may further include injection molding of the extrudate. The PLA-based composites may be used for manufacturing a molded article or product having enhanced impact strength and enhanced HDT relative to neat or virgin PLA. The method of manufacturing a molded product may include a step of molding the above-described composites by injection molding, extrusion molding, blow molding, vacuum molding, compression molding, and so forth.

The injection molding conditions may vary. However, in some embodiments, the injection molding conditions may be as follows: melt temperature from about 180° C. to about 240° C., mold temperature from about 30° C. to about 90° C., and cooling time from about 30 seconds to about 90 seconds.

Lab scale extrusion and injection molding can be done using a variety of equipment known in the art. In some embodiments, lab scale extrusions and injection moldings were performed on a micro twin-screw extruder and micro injection molder (DSM Research, Netherlands). The screw configuration in the extruder was co-rotating and was operated at a RPM of 100. Pilot scale extrusion can be carried out in a co-rotating twin-screw extruder (Leistritz, US) with a screw diameter of 27 mm. Two component injection molding machine (Arburg, Germany) can be used for the pilot scale injection molding.

V. Methods of Using the Composites

The composites described herein can be used to prepare an article of manufacture that is made from plastics and or plastic/synthetic fillers and fibers. Examples include but are not limited to, injection molded articles, such as car parts, toys, consumer products, building materials, etc.

In one embodiment, the composites may contain up to 90 wt. % bio-based content. The ABS-based composites may be derived from a combination of a renewable (e.g., derived from a renewable resource) material along with a recycled material, a regrind material, or mixtures thereof. In some embodiments, the composite contains one or more fillers, such as natural fibers and/or mineral fillers.

EXAMPLES

Materials and Methods

The following materials and methods were, unless indicated otherwise, used for the Examples.

Tensile and flexural properties of the neat ABS properties were measured using Instron Instrument Model 3382 following ASTM standards D638 and D790, respectively. Tensile tests were carried out at room temperature with a gauge length of 50 mm and at a crosshead speed of 5 mm/min. A span length of 52 mm and crosshead speed of 14 mm/min were used for flexural tests. All blends were measured under the same conditions for comparison.

Notched Izod impact tests as per ASTM D256 at room temperature were accomplished using TMI 43-02 Monitor Impact Tester with a 5 ft-lb pendulum. Heat deflection temperature (HDT) was evaluated using a dynamic mechanical analyzer (DMA Q800) supplied by TA Instruments in three-point bending mode at a constant applied load of 0.455 MPa. The samples were heated from room temperature to the desired temperature at a ramp rate of 2° C.·min−1. HDT was reported as the temperature at which a deflection of 0.25 mm occurred. The results reported herein are average values obtained after testing at least 5 samples for tensile and flexural properties, 6 samples for impact strength and 2 samples for HDT.

Example 1

Preparation of Acrylonitrile Butadiene Styrene (ABS)/Polylactic Acid (PLA) Blend Containing an Acrylic Copolymer-Based Lubricant and Chain Extender Using Lab Scale Equipment Example blend 1A (Blend 1) was prepared containing 71.9 wt. % ABS (Styron-Magnum 1150EM), 26 wt. % PLA (PLA Ingeo3052D, Nature Works), 2 wt. % lubricant (BIOSTRENGTH®900), and 0.1 wt. % chain extender (JONCRYL® ADR 4368 (BASF)). The blend was extruded in a DSM Micro 15 cc twin screw compounder, with a 240° C. extrusion temperature, a 100 RPM screw speed, and a 2 minute retention time. The material was molded using a DSM micro 12 cc mini injection molder. Both injection and holding were set to 6 bar pressure, injection took 4 seconds, while holding took 8 seconds.

Example blend 1B (Blend 2) was prepared containing 71.9 wt. % ABS (Styron-Magnum 1150EM), 25 wt. % PLA (PLA Ingeo 3052D, Nature Works), 3 wt. % lubricant (BIOSTRENGTH® 900), and 0.1 wt. % chain extender (JONCRYL® ADR 4368 BASF). The blend was extruded in a DSM Micro 15 cc twin screw compounder, with a 240° C. extrusion temperature, a 100 RPM screw speed, and a 2 minute retention time. The material was molded using a DSM micro 12 cc mini injection molder. Both injection and holding were set to 6 bar pressure, injection took 4 seconds, while holding took 8 seconds.

Example blend 1C (Blend 3) was prepared containing 69.9 wt. % ABS (Styron-Magnum 1150EM), 28 wt. % PLA (PLA Ingeo 3052D, Nature Works), 2 wt. % lubricant (BIOSTRENGTH® 900), and 0.1 wt. % chain extender (JONCRYL® ADR 4368 BASF). The blend was extruded in a DSM Micro 15 cc twin screw compounder, with a 240° C. extrusion temperature, a 100 RPM screw speed, and a 2 minute retention time. The material was molded using a DSM micro 12 cc mini injection molder. Both injection and holding were set to 6 bar pressure, injection took 4 seconds, while holding took 8 seconds.

Example blend 1D (Blend 4) was prepared containing 67.9% ABS (Styron-Magnum 1150EM), 30 wt. % PLA (PLA Ingeo 3052D, Nature Works), 2 wt. % lubricant (BIOSTRENGTH® 900), and 0.1 wt. %_chain extender (JONCRYL® ADR 4368 BASF). The blend was extruded in a DSM Micro 15 cc twin screw compounder, with a 240° C. extrusion temperature, a 100 RPM screw speed, and a 2 minute retention time. The material was molded using a DSM micro 12 cc mini injection molder. Both injection and holding were set to 6 bar pressure, injection took 4 seconds, while holding took 8 seconds.

Example blend 1E (Blend 5) was prepared containing 62.9 wt. % ABS (Styron-Magnum 1150EM), 35 wt. % PLA (PLA Ingeo 3052D, Nature Works), 2 wt. % lubricant (BIOSTRENGTH® 900), and 0.1 wt. % chain extender (JONCRYL® ADR 4368 BASF). The blend was extruded in a DSM Micro 15 cc twin screw compounder, with a 240° C. extrusion temperature, a 100 RPM screw speed, and a 2 minute retention time. The material was molded using a DSM micro 12 cc mini injection molder. Both injection and holding were set to 6 bar pressure, injection took 4 seconds, while holding took 8 seconds.

Example blend 1F (Blend 6) was prepared containing 57.9 wt. % ABS (Styron-Magnum 1150EM), 40 wt. % PLA (PLA Ingeo 3052D, Nature Works), 2 wt. % lubricant (BIOSTRENGTH® 900), and 0.1 wt. % chain extender (JONCRYL® ADR 4368 BASF). The blend was extruded in a DSM Micro 15 cc twin screw compounder, with a 240° C. extrusion temperature, a 100 RPM screw speed, and a 2 minute retention time. The material was molded using a DSM micro 12 cc mini injection molder. Both injection and holding were set to 6 bar pressure, injection took 4 seconds, while holding took 8 seconds.

Example blend 1G (Blend 7) was prepared containing 48 wt. % ABS (Styron-Magnum 1150EM), 50 wt. % PLA (PLA Ingeo 3052D, Nature Works), 1.5 wt. % lubricant (BIOSTRENGTH® 900), and 0.5 wt. % chain extender (JONCRYL® ADR 4368 BASF). The blend was extruded in a DSM Micro 15 cc twin screw compounder, with a 240° C. extrusion temperature, a 100 RPM screw speed, and a 2 minute retention time. The material was molded using a DSM micro 12 cc mini injection molder. Both injection and holding were set to 6 bar pressure, injection took 4 seconds, while holding took 8 seconds.

Example blend 1H (Blend 8) was prepared containing 28 wt. % ABS (Styron-Magnum 1150EM), 70 wt. % PLA (PLA Ingeo 3052D, Nature Works), 1.5 wt. % lubricant (BIOSTRENGTH® 900), and 0.5 wt. % chain extender (JONCRYL® ADR 4368 BASF). The blend was extruded in a DSM Micro 15 cc twin screw compounder, with a 240° C. extrusion temperature, a 100 RPM screw speed, and a 2 minute retention time. The material was molded using a DSM micro 12 cc mini injection molder. Both injection and holding were set to 6 bar pressure, injection took 4 seconds, while holding took 8 seconds.

A comparison of the mechanical properties of neat ABS and the blend formed in Example 1 is shown in Table 1:

TABLE 1

Mechanical properties of neat ABS and ABS/PLA blend

| Example | TS (MPa) | TM (GPa) | EAT (%) | FS (MPa) | FM (GPa) | IS (J/m) | MFI (g/10 min) | HDT (° C.) |
|---|---|---|---|---|---|---|---|---|
| ABS Lustran (EG) | 39.9 ± 3.68 | 1.58 ± 0.01 | 39.5 ± 5.4 | 65.3 ± 1.66 | 1.92 ± 0.03 | 414 ± 20 | 1.5 ± 0.3 | 89.8 ± 1.9 |
| ABS Magnum (HIG) | 35.3 ± 2.87 | 1.90 ± 0.01 | 34.2 ± 3.9 | 57.7 ± 1.08 | 1.99 ± 0.02 | 507 ± 24 | 1.1 ± 0.2 | 93.5 ± 0.8 |
| Blend 1 | 41.5 ± 0.92 | 1.70 ± 0.05 | 90.9 ± 27.9 | 62.6 ± 2.57 | 1.88 ± 0.10 | 573 ± 28 | 3.02 ± 1.4 | 90.9 ± 6.3 |
| Blend 2 | 44.6 ± 0.91 | 1.65 ± 0.05 | 91.4 ± 5.86 | 68.5 ± 0.72 | 2.20 ± 0.03 | 580 ± 26 | 7.52 ± 1.8 | 88.9 ± 2.3 |
| Blend 3 | 42.9 ± 0.34 | 1.73 ± 0.02 | 114 ± 5.65 | 66.2 ± 1.99 | 1.99 ± 0.07 | 449 ± 13 | 9.42 ± 0.4 | 84.5 ± 3.9 |

TABLE 1-continued

Mechanical properties of neat ABS and ABS/PLA blend

| Example | TS (MPa) | TM (GPa) | EAT (%) | FS (MPa) | FM (GPa) | IS (J/m) | MFI (g/10 min) | HDT (° C.) |
|---|---|---|---|---|---|---|---|---|
| Blend 4 | 41.5 ± 0.24 | 2.21 ± 0.03 | 94.5 ± 3.75 | 67.7 ± 4.29 | 2.20 ± 0.10 | 458 ± 51 | 12.4 ± 1.1 | 88.6 ± 1.4 |
| Blend 5 | 44.3 ± 0.17 | 2.37 ± 0.01 | 104 ± 0.53 | 74.3 ± 2.17 | 2.58 ± 0.1 | 367 ± 27 | 13.3 ± 1.2 | 86.7 ± 2.2 |
| Blend 6 | 41 ± 0.41 | 1.73 ± 0.02 | 137 ± 6.28 | 68.4 ± 0.98 | 2.31 ± 0.01 | 151 ± 9.9 | 23.7 ± 2.0 | 82.8 ± 1.8 |
| Blend 7 | 48.3 ± 0.49 | 1.82 ± 0.08 | 174 ± 4.66 | 73.7 ± 4.3 | 2.48 ± 0.12 | 360 ± 24 | 2.4 ± 0.1 | 73.7 ± 4.6 |
| Blend 8 | 53.1 ± 2.26 | 1.84 ± 0.5 | 205 ± 25 | 84.92 ± 3.4 | 2.85 ± 0.09 | 167 ± 35 | 4.8 ± 0.2 | 58.8 ± 3.0 |

In the Tables the following abbreviations will be used: EG: Extrusion Grade, HIG: High Impact Grade, TS: Tensile strength, TM: Tensile Modulus, EAT: Elongation At Break, FS: Flex strength, FM: Flex Modulus, IS: Impact Strength, MFI: melt flow index, and HDT: heat deflection temperature" or "heat distortion temperature.

Example 2

Preparation of Acrylonitrile Butadiene Styrene (ABS)/Polylactic Acid (PLA) Blend Containing an Acrylic Copolymer-Based Lubricant and Chain Extender Using Pilot Scale Equipment Two blends were prepared: example blend 2A (Blend 9) containing 72.9 wt. % ABS (Styron-Magnum 1150EM), 25 wt. % PLA (PLA 3052D, Nature Works), 2 wt. % lubricant (BIOSTRENGTH® 900), and 0.1 wt. % chain extender (JONCRYL® ADR (BASF)), and example blend 2B (Blend 10) containing 47.75 wt. % ABS (Styron-Magnum 1150EM), 50 wt. % PLA (PLA 3052D, Nature Works), 2 wt. % BIOSTRENGTH® 900, and 0.25 wt. % JONCRYL® ADR (BASF).

All formulations including blends and composites were extruded in a Leistritz twin screw compounder with 100 RPM screw speed and 180° C.-240° C. temperature profile.

The material was molded using an Arburg Allrounder injection molder. The material was molded with 15 mm/sec injection time, and 20 second cooling time.

A comparison of the mechanical properties of neat ABS and the blend formed in Example 2 is shown in Table 2:

TABLE 2

Mechanical properties of ABS/PLA blend using pilot scale equipment

| Example | TS (MPa) | TM (GPa) | EAT (%) | FS (MPa) | FM (GPa) | IS (J/m) | MFI g/10 min |
|---|---|---|---|---|---|---|---|
| ABS Magnum (HIG) | 35.3 ± 2.87 | 1.90 ± 0.01 | 34.2 ± 3.9 | 57.7 ± 1.08 | 1.99 ± 0.02 | 507 ± 24 | 1.1 ± 0.2 |
| Blend 9 | 41.0 ± 0.79 | 2.25 ± 0.03 | 43.4 ± 5.16 | 63.78 ± 0.62 | 2.10 ± 0.04 | 359 ± 64 | 9.64 ± 1.18 |
| Blend 10 | 47.7 ± 0.55 | 2.62 ± 0.05 | 116 ± 27 | 71.95 ± 0.54 | 2.40 ± 0.04 | 433 ± 14.6 | 13.82 ± 1.07 |

Example 3

Preparation of Acrylonitrile Butadiene Styrene (ABS)/Polylactic Acid (PLA) Blend Containing an Acrylic Copolymer Based Lubricant and Chain Extender with Fillers Four examples were prepared:

Example 3A (composite 1) was prepared containing 68.3 wt. % ABS (Styron-Magnum 1150EM), 24.7 wt. % PLA (PLA 3052D, Nature Works), 1.9 wt. % lubricant (BIO-STRENGTH® 900), 0.1 wt. % chain extender (JONCRYL® ADR (BASF)), and 5 wt. % BioChar.

Example 3B (composite 2) was prepared containing 75 wt. % ABS (Styron-Magnum 1150EM), 14.25 wt. % PLA (PLA 3052D, Nature Works), 4.75 wt. % BIOSTRENGTH® 900, 1 wt. % JONCRYL® ADR (BASF) and 5 wt. % Miscanthus fiber.

Example 3C (composite 3) was prepared containing 63 wt. % ABS (Styron-Magnum 1150EM), 12 wt. % PLA (PLA 3052d, Nature Works), 4 wt. % BIOSTRENGTH® 900, 1 wt. % JONCRYL® ADR (BASF) and 20 wt. % Talc.

Example 3D (composite 4) was prepared containing 75 wt. % ABS (Styron-Magnum 1150EM), 14.25 wt. % PLA (PLA 3052D, Nature Works), 4.75 wt. % BIOSTRENGTH® 900, 1 wt. % JONCRYL® ADR (BASF) and 5 wt. % Coffee Chaff.

All composites were prepared in a DSM Micro 15 cc twin screw compounder, with a 220° C. extrusion temperature, a 100 RPM screw speed, and a 2 minute retention time. The material was molded using a DSM micro 12 cc mini injection molder. Both injection and holding were set to 6 bar pressure, injection took 4 seconds, while holding took 8 seconds A comparison of the mechanical properties of composites of ABS/PLA blends is shown in Table 3:

TABLE 3

Mechanical properties of composites of ABS/PLA blends

| Example | Impact Strength (J/m) |
|---|---|
| Example 3A (Composite 1) | 64.2 ± 2.9 |
| Example 3B (Composite 2) | 79.7 ± 8.1 |
| Example 3C (Composite 3) | 59.0 ± 4.8 |

TABLE 3-continued

Mechanical properties of composites of ABS/PLA blends

| Example | Impact Strength (J/m) |
|---|---|
| Example 3D (Composite 4) | 135 ± 8.2 |

Example 4

Preparation of Acrylonitrile Butadiene Styrene (ABS)/Polylactic Acid (PLA) Blend Processed at Previous Art Conditions Example blend 4A (Blend 11) was prepared using the same formulation as example blend 1B, with adjusted processing conditions. The method for making this blend involved changing the processing temperature to 206° C., to conform with processing conditions outlined in aforementioned US Patent Application No US/20120220711. Under these processing conditions, the toughness of the blend is severely decreased.

The mechanical properties of the blend formed in Example 4 is shown in Table 4:

TABLE 4

Mechanical properties of ABS/PLA blend with altered processing conditions

| Example | TS (MPa) | TM (GPa) | EAT (%) | FS (MPa) | FM (GPa) | IS (J/m) |
|---|---|---|---|---|---|---|
| Blend 11 | 41.6 ± 0.88 | 1.73 ± 0.3 | 15.1 ± 4.94 | 70.7 ± 0.94 | 2.33 ± 0.03 | 181 ± 15.8 |

Example 5

Preparation of Acrylonitrile Butadiene Styrene (ABS)/Polylactic Acid (PLA) Blend Processed with Alternate Additives Example blend 5A (Blend 12) was prepared using the same formulation as blend 1B, with a substitute for Biostrength 900. Instead, 3 wt. % of Elvaloy PTW (DuPont) was used. The blend was made with identical processing conditions as blend 1B. However, the inclusion of this impact modifier showed decreased performance to blend 2.

The mechanical properties of the blend formed in Example 5 is shown in Table 5:

TABLE 5

Mechanical properties of ABS/PLA blends processed with alternate additives

| Example | TS (MPa) | TM (GPa) | EAT (%) | FS (MPa) | FM (GPa) | IS (J/m) |
|---|---|---|---|---|---|---|
| Blend 12 | 37.9 ± 0.65 | 1.72 ± 0.1 | 8.05 ± 2.03 | 62.1 ± 0.59 | 2.09 ± 0.02 | 60.9 ± 1.42 |

Example 6

Morphology Changes for High Performance Blends

Example blend 6A and 6B were prepared to provide evidence to the changing morphological structure of materials with both a lubricant and chain extender. Blend 6A contains 75 wt. % ABS (Styron-Magnum 1150EM), 25 wt. % PLA (PLA 3052D, Nature Works); blend 6B contains 70 wt. % ABS (Styron-Magnum 1150EM), 25 wt. % PLA (PLA 3052D, Nature Works) and 5 wt. % lubricant (BIO-STRENGTH® 900).

Figure 2:
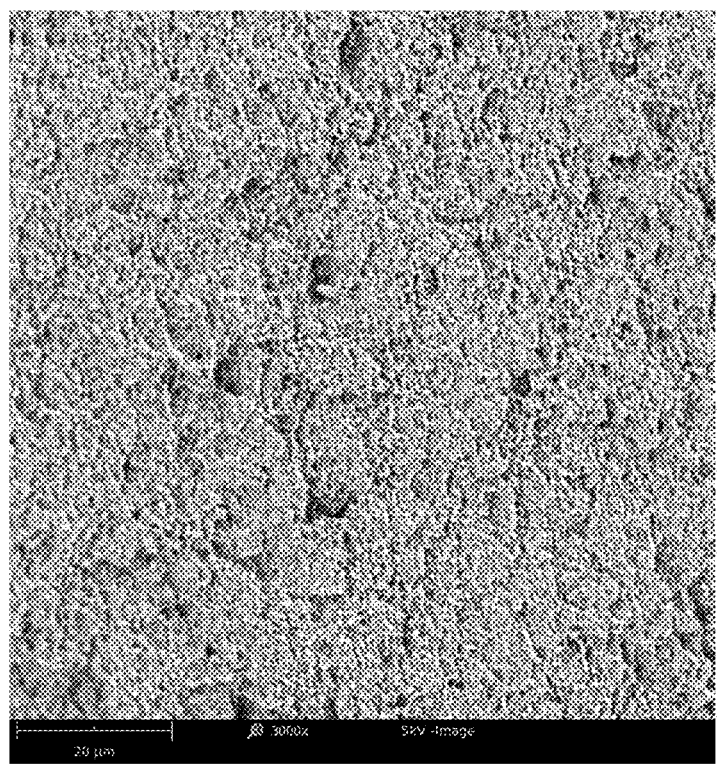
FIG. 2 is a SEM image of the impact fracture surface of example blend 1B (see Example 1).

FIGS. 1-4 are high resolution images showing the structure of the morphology of the blends. FIGS. 1 and 2 are scanning electron microscopy (SEM) images of the impact fracture surface of blend 6A and blend 1B. Blend 1B shows a more refined structure than a blend without additives, with less separation between phases, which allows absorption of more energy during impact testing.

Figure 3:
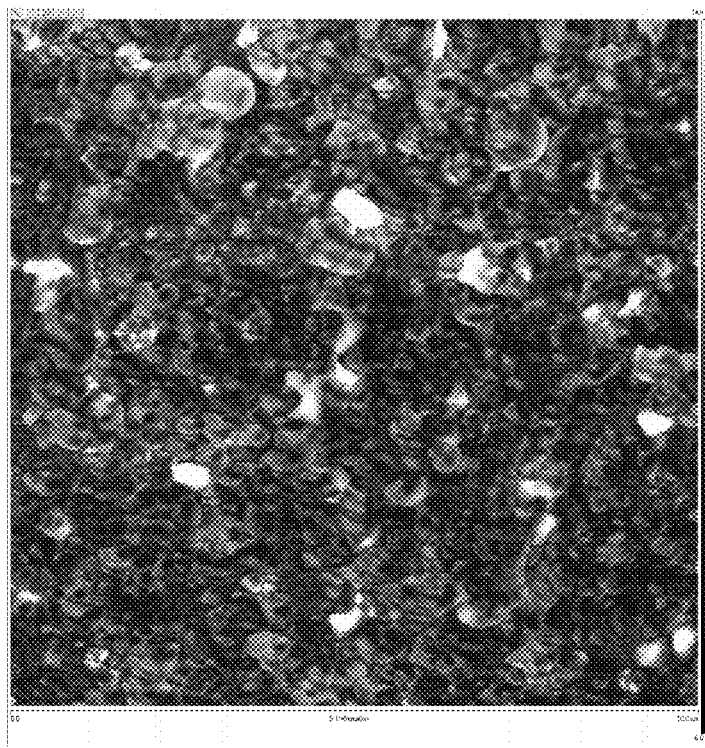
FIG. 3 is a Bruker Multimode atomic force microscope (AFM) image showing the structure of the morphology of example blend 6B (see Example 6).
Figure 4:
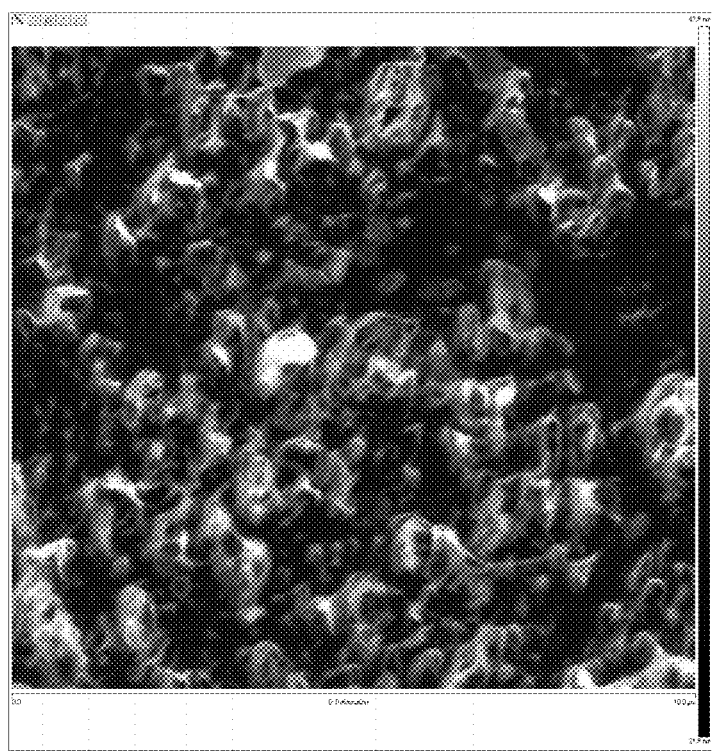
FIG. 4 is a Bruker Multimode AFM image showing the structure of the morphology of example blend 1B (see Example 1).

FIGS. 3 and 4 were taken on a Bruker Multimode atomic force microscope (AFM), and shows the deformation of the tip into surface, with a constant force. FIG. 3 shows blend 6B structure, and FIG. 4 shows blend 1B structure. One can see that without the chain extender and the lubricant together, the phases are much more defined in terms of separation, and do not show as much compatibility. Deformation plots show a better absorption of energy for blend 1B than with only the lubricant.

The blend in Example 1 exhibit a high Notched Izod Impact Strength compared to neat ABS. Example 2 shows the scale up ability of the material, processed under pilot scale equipment. Although impact strength and heat deflection temperature are the properties of focus, all stated mechanical properties must be similar to unmodified ABS. For some embodiments, which cost is sufficiently low, lesser properties may be acceptable. Table 3 suggests that adding natural fiber/biofiller requires some optimization for better performance, and that smaller fiber sizes produce better performing impact resistance in the material. Examples 4, 5, and 6 establish that processing conditions and precise ingredients are required for these formulations to create high performing materials.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A high performance acrylonitrile butadiene styrene (ABS) polymer blend comprising ABS, polylactic acid (PLA), an acrylic copolymer based lubricant that improves metal release of PLA and a polymeric chain extender.

2. The blend of claim 1, wherein the PLA concentration is 29 wt. % or less of the blend.

3. The blend of claim 1, wherein the PLA concentration is more than 30 wt. % of the blend.

4. The blend of claim 1, wherein the PLA comprises virgin PLA, recycled PLA, or combinations thereof.

5. The blend of claim 1, wherein the ABS is a high impact ABS.

6. The blend of claim 1, wherein the concentration of the ABS is from about 20 wt. % to about 90 wt. % of the blend.

7. The blend of claim 1, wherein the concentration of the acrylic copolymer based lubricant is from about 1 wt. % to about 10 wt. % of the blend.

8. The blend of claim 1, wherein the chain extender is an epoxy-functionalized styrene-acrylic polymer comprising glycidyl methacrylate (GMA).

9. The blend of claim 8, wherein the concentration of the epoxy-functionalized styrene-acrylic polymer is from about 0.1 wt. % to about 1.5 wt. % of the blend.

10. The blend of claim 1, wherein the blend exhibits a Notched Izod Impact Strength greater than 151 J/m when measured in accordance with ASTM D256.

11. The blend of claim 1, wherein the blend exhibits a Notched Izod Impact Strength greater than 414 J/m when measured in accordance with ASTM D256.

12. The blend of claim 1, wherein the blend exhibits both a tensile strength and flexural strength greater than the tensile strength and flexural strength of neat ABS when measured in accordance with ASTM D638 and D790, respectively.

13. The blend of claim 1, wherein the blend exhibits a tensile strength greater than 40 MPa when measured in accordance with ASTM D638.

14. The blend of claim 1, wherein the blend a flexural strength greater than 60 MPa when measured in accordance with ASTM D790.

15. An article comprising the blend of claim 1.

16. A high performance acrylonitrile butadiene styrene (ABS) polymer blend made by a process comprising:
 (a) forming a mixture of ABS, polylactic acid (PLA), an acrylic copolymer based lubricant and a polymeric chain extender polymer; and
 (b) extruding the mixture at a temperature of 230° C. to 250° C. to form the high performance ABS polymer blend.

* * * * *